United States Patent
He et al.

(10) Patent No.: US 12,068,989 B2
(45) Date of Patent: Aug. 20, 2024

(54) SIGNALING APPROACHES FOR NEW RADIO IN THE UNLICENSED SPECTRUM

(71) Applicant: Apple Inc., Cupertino, CA (US)

(72) Inventors: Hong He, San Jose, CA (US); Chunhai Yao, Beijing (CN); Chunxuan Ye, San Diego, CA (US); Dawei Zhang, Saratoga, CA (US); Haitong Sun, Cupertino, CA (US); Oghenekome Oteri, San Diego, CA (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 394 days.

(21) Appl. No.: 17/593,587

(22) PCT Filed: Apr. 8, 2020

(86) PCT No.: PCT/CN2020/083714
§ 371 (c)(1),
(2) Date: Sep. 21, 2021

(87) PCT Pub. No.: WO2021/203283
PCT Pub. Date: Oct. 14, 2021

(65) Prior Publication Data
US 2022/0311575 A1 Sep. 29, 2022

(51) Int. Cl.
*H04W 4/00* (2018.01)
*H04L 5/00* (2006.01)
(Continued)

(52) U.S. Cl.
CPC .......... *H04L 5/0048* (2013.01); *H04L 5/0007* (2013.01); *H04W 74/006* (2013.01); *H04W 74/0808* (2013.01)

(58) Field of Classification Search
CPC .. H04L 5/0048; H04L 5/0007; H04W 74/006; H04W 74/0808
See application file for complete search history.

(56) References Cited

U.S. PATENT DOCUMENTS

| | | | |
|---|---|---|---|
| 2013/0242921 A1* | 9/2013 | Kim | H04B 7/024 370/329 |
| 2020/0236729 A1* | 7/2020 | Ahn | H04W 16/14 |

(Continued)

FOREIGN PATENT DOCUMENTS

| | | |
|---|---|---|
| CN | 110932828 | 3/2020 |
| WO | 2019/035631 | 2/2019 |
| WO | 2020/033798 | 2/2020 |

OTHER PUBLICATIONS

Qualcomm Incorporated, "Feature lead summary on initial access signals and channels for NR-U", 3GPP TSG RAN WG1 Meeting #99; R1-1913303; Nov. 19, 2019; 47 sheets.

(Continued)

*Primary Examiner* — Abdelnabi O Musa
(74) *Attorney, Agent, or Firm* — Fay Kaplun & Marcin, LLP

(57) ABSTRACT

The exemplary embodiments relate to signaling between a user equipment (UE) and a cell over the unlicensed spectrum. The UE may receive a signal broadcast by a cell of the network over a channel in the unlicensed spectrum. The signal includes a set of channel state information reference signals (CSI-RS) each corresponding to a set of synchronization signal blocks (SSB) and is transmitted during a discovery reference signal (DRS) window. The UE may then determine a location of the set of CSI-RS within the DRS window and perform an operation based on the set of CSI-RS.

20 Claims, 13 Drawing Sheets

(51) Int. Cl.
H04W 74/00 (2009.01)
H04W 74/0808 (2024.01)

(56) References Cited

U.S. PATENT DOCUMENTS

| | | | | |
|---|---|---|---|---|
| 2020/0275483 | A1* | 8/2020 | Li | H04L 5/0078 |
| 2020/0304260 | A1* | 9/2020 | Si | H04W 48/12 |
| 2020/0314889 | A1* | 10/2020 | Cirik | H04W 72/23 |
| 2020/0314917 | A1* | 10/2020 | Jeon | H04W 74/08 |
| 2021/0014694 | A1* | 1/2021 | Li | H04W 16/14 |
| 2021/0058970 | A1* | 2/2021 | Kwak | H04L 5/0064 |
| 2022/0070922 | A1* | 3/2022 | Talarico | H04W 74/0808 |
| 2023/0141702 | A1* | 5/2023 | Ganesan | H04L 5/0053 370/329 |
| 2023/0371074 | A1* | 11/2023 | Lin | H04W 74/0816 |

OTHER PUBLICATIONS

ZTE et al., "Discussion on enhancement of initial access procedures for NR-U", 3GPP TSG RAN WG1 Meeting #96bis; R1-1903874; Mar. 30, 2019; 12 sheets.

* cited by examiner

| Index 502 | Symbol Offset 504 | RB Offset 506 |
|---|---|---|
| 0 | $\Delta_{offset,t0}$ | $\Delta_{offset,f0}$ |
| 1 | $\Delta_{offset,t1}$ | $\Delta_{offset,f1}$ |
| ... | ... | ... |
| M | $\Delta_{offset,tM}$ | $\Delta_{offset,fM}$ |

Table 500

| Index 1002 | K3 1004 | F 1006 | T 1008 |
|---|---|---|---|
| 0 | $K_3^1$ | $F_1$ | $T_1$ |
| 1 | $K_3^2$ | $F_2$ | $T_2$ |
| ... | ... | ... | ... |
| M | $K_3^n$ | $F_n$ | $T_n$ |

Table 1000

US 12,068,989 B2

SIGNALING APPROACHES FOR NEW RADIO IN THE UNLICENSED SPECTRUM

BACKGROUND

A user equipment (UE) may establish a connection to at least one of multiple different networks or types of networks. In some networks, signaling between the UE and a cell of the network may be performed over the unlicensed spectrum. The unlicensed spectrum is shared by different devices using different communication protocols. Accordingly, access to the unlicensed spectrum may implicate various regulations and/or standards. For instance, Listen-Before-Talk (LBT) may be implemented in accordance with these regulations and/or standards to access the unlicensed spectrum for communications. LBT generally relates to determining whether a channel in the unlicensed spectrum is occupied by other signals prior to performing a transmission over that channel. If LBT fails, the channel is considered to be busy and the transmission may not be performed. If LBT succeeds, the channel is considered to be clear and the transmission may be performed.

For New Radio in the unlicensed spectrum (NR-U), the manner in which conventional channel state information reference signal (CSI-RS) signaling approaches account for listen-before-talk (LBT) failure has been identified as a cause of inefficiency. From the network perspective, the conventional approaches increase signaling overhead. From the UE perspective, the conventional approaches include the UE blindly searching for CSI-RS. This causes the UE to experience a power drain. Accordingly, there is a need to improve resource efficiency for CSI-RS transmission in NR-U.

Further, in NR-U, LBT failure may cause latency during a physical random access channel (PRACH) procedure. The manner in which a conventional PRACH procedure accounts for LBT failure has also been identified as a cause of unnecessary latency and inefficiency. For instance, the conventional approaches increase signaling overhead and may result in uplink resource underutilization. Accordingly, there is a need to improve the PRACH procedure in NR-U.

SUMMARY

According to an exemplary embodiment, a computer readable storage medium includes a set of instructions that when executed by a processor of a user equipment (UE) causes the processor to perform operations. The operations include receiving a signal broadcast by a cell of a network over a channel in the unlicensed spectrum. The signal includes a set of channel state information reference signals (CSI-RS) each corresponding to a set of synchronization signal blocks (SSB) and is transmitted during a discovery reference signal (DRS) window. The operations further include determining a location of the set of CSI-RS within the DRS window and performing an operation based on the set of CSI-RS.

Further exemplary embodiments include a transceiver configured to communicate with a network and a processor configured to perform operations. The operations include receiving a signal broadcast by a cell of the network over a channel in the unlicensed spectrum. The signal includes a set of channel state information reference signals (CSI-RS) each corresponding to a set of synchronization signal blocks (SSB) and is transmitted during a discovery reference signal (DRS) window. The operations further include determining a location of the set of CSI-RS within the DRS window and performing an operation based on the set of CSI-RS.

DETAILED DESCRIPTION

Figure 1:
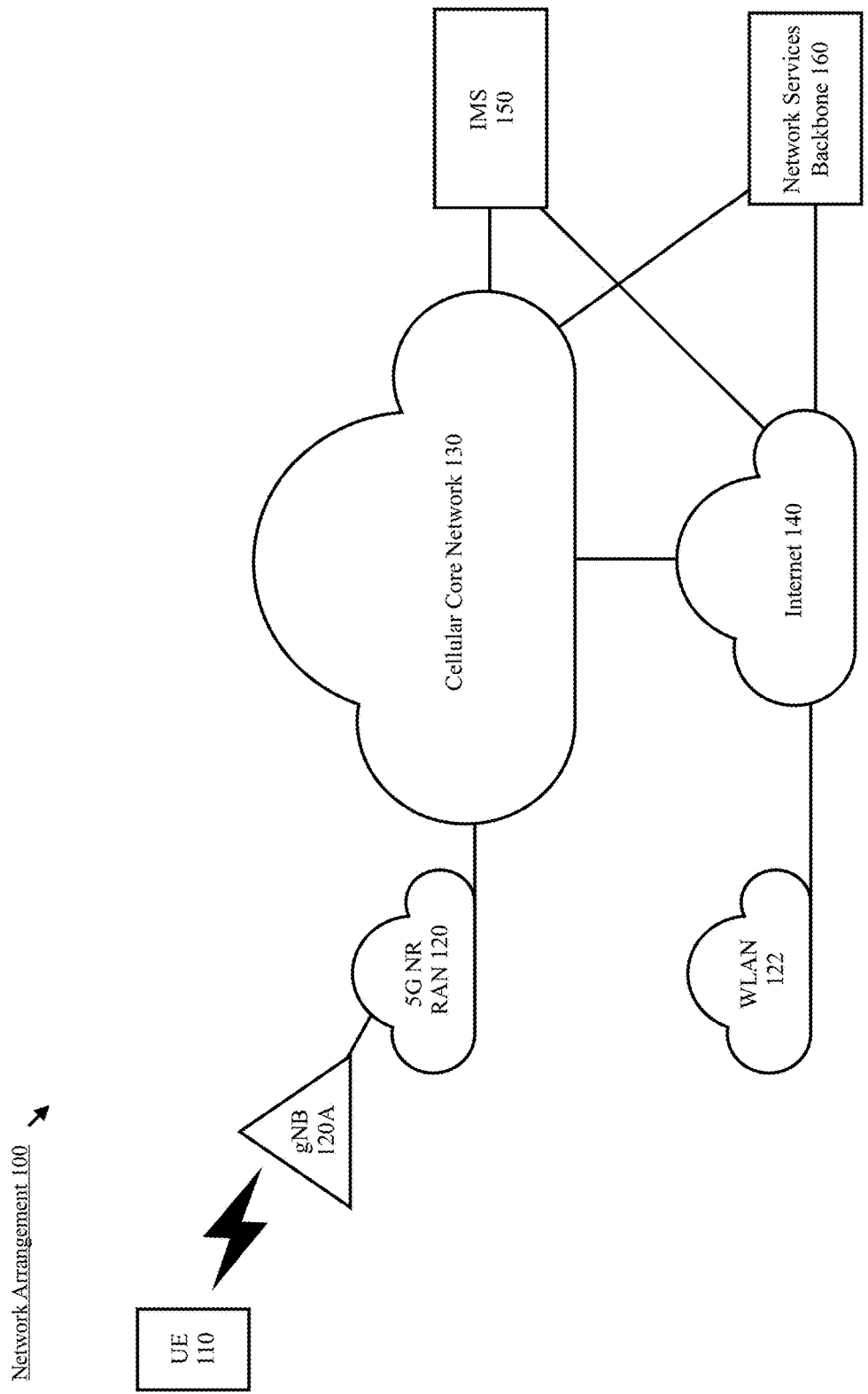
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to signaling between a user equipment (UE) and a cell over the unlicensed spectrum. As will be explained in more detail below, in a first aspect, the exemplary embodiments relate to the transmission of reference signals over the unlicensed spectrum. In a second aspect, the exemplary embodiments relate to physical random access channel (PRACH) for unlicensed operation.

The exemplary embodiments are described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

The exemplary embodiments are also described with regard to the UE communicating with a 5G New Radio (NR)

network operating in the unlicensed spectrum (5G NR-U). However, reference to 5G NR-U is merely provided for illustrative purposes. The exemplary embodiments may apply to any type of network operating in the unlicensed spectrum.

The unlicensed spectrum is a shared transmission medium where a plurality of different devices utilizing a plurality of different communication protocols may utilize the unlicensed spectrum for communications. Accordingly, access to the unlicensed spectrum for NR-U purposes may implicate various regulations and/or standards. For instance, Listen-Before-Talk (LBT) may be implemented in accordance with these regulations and/or standards to access the unlicensed spectrum for communications. LBT may relate to determining whether channels in the unlicensed spectrum are occupied by other signals prior to performing a transmission over the unlicensed spectrum.

For example, a transmitting device (e.g. a UE, a cell, etc.) may perform clear channel assessment (CCA) to sense whether a channel of the unlicensed spectrum that may be used for the transmission is busy. If the channel is busy, the transmitting device may continue to perform the CCA until it is determined that a channel is clear. Alternatively, if the channel is busy, the transmitting device may delay the transmission by a fixed or dynamic duration until it is likely that a channel of the unlicensed spectrum is clear. Once it is determined that a channel is clear, the transmitting device may perform the transmission over the unlicensed spectrum. However, reference to LBT is merely provided for illustrative purposes, different regulations or standards may refer to similar mechanisms or procedures by different names.

The exemplary embodiments are further described with regard to a discovery reference signal (DRS). Generally, a DRS refers to a set of reference signals and/or synchronization signals transmitted by a cell. The contents of the DRS may be used by the UE for various operations such as, but not limited to, cell detection, cell search procedures, channel state information (CSI) detection, CSI measurement, beam selection, beam management and radio resource management (RRM). The DRS may be transmitted periodically in a time window referred to as a DRS window. Each DRS window is configured to be a predetermined duration (e.g., 2 milliseconds (ms), 5 ms, 10 ms, etc.) and occur at a predetermined periodicity (e.g., 20 ms, 40 ms, 80 ms, 140 ms, etc.). For example, a DRS window of (x) ms may be scheduled to occur every (y) ms. However, any reference to DRS and a DRS window is merely provided for illustrative purposes, different entities may refer to similar concepts by a different name.

In a first aspect, the exemplary embodiments are directed to improve resource efficiency by implementing an exemplary CSI-RS configuration within a DRS. Under conventional circumstances, the UE has to blindly search each candidate CSI-RS location within a DRS window for CSI measurement due to the conventional configuration of CSI-RS within the DRS window. This causes the UE to experience a power drain and increases the signaling overhead. The exemplary embodiments use a set of periodic non-zero power CSI-RS (NZP-CSI-RS) that are paired with a corresponding set of synchronization signal blocks (SSBs) within the DRS window. This exemplary configuration is a more efficient use of network resources and allows the UE to determine the location of the NZP-CSI-RS within the DRS window. Compared to the conventional configuration mentioned above, this exemplary configuration reduces signaling overhead to transmit this configuration from gNB to UE and allows the UE to expend less power for CSI-RS detection/measurement. Various examples of exemplary CSI-RS configurations within a DRS, CSI-RS detection techniques, CSI-RS transmission and CSI-RS sequence generation will be described in more detail below.

The exemplary embodiments are also described with regard to a physical random access channel (PRACH) procedure. Generally, the PRACH procedure may be used to achieve uplink synchronization between the UE and the cell of the network. Under conventional circumstance, the network assigns the UE resources to use during the PRACH procedure. If LBT failure occurs during the PRACH procedure, the UE waits until the next scheduled resource to perform LBT again and attempt to perform the PRACH signaling. However, this introduces unnecessary latency into the PRACH procedure In a second aspect, the exemplary embodiments relate to implementing dynamic PRACH resource allocation. This exemplary approach is a more efficient use of network resources and minimizes channel access latency. Various examples of how the network may provide the UE with dynamic PRACH resources and how the UE may utilize this dynamic PRACH resources will be described in more detail below.

FIG. 1 shows a network arrangement 100 according to various exemplary embodiments. The network arrangement 100 includes the UE 110. Those skilled in the art will understand that the UE 110 may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. An actual network arrangement may include any number of UEs being used by any number of users. Thus, the example of a single UE 110 is only provided for illustrative purposes.

The UE 110 may be configured to communicate directly with one or more networks. In the example of the network arrangement 100, the UE 110 may wirelessly communicate with a 5G new radio (NR) radio access network (5G NR RAN) 120 and a wireless local access network (WLAN) 122. The 5G NR RAN 120 may be configured to operate in the unlicensed spectrum, e.g., 5G NR-U. The UE 110 may also communicate with other types of networks (e.g., an LTE RAN, a legacy RAN etc.). The UE 110 may also communicate with networks over a wired connection. Therefore, the UE 110 may include a 5G NR chipset to communicate with the 5G NR RAN 120 and an ISM chipset to communicate with the WLAN 122.

The 5G NR RAN 120 may be a portion of a cellular network that may be deployed by a network carrier (e.g., Verizon, AT&T, Sprint, T-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 122 may include any type of wireless local area network (WiFi, Hot Spot, IEEE 802.11x networks, etc.).

The UE 110 may connect to the 5G NR RAN 120 via a cell 120A. Those skilled in the art will understand that any association procedure may be performed for the UE 110 to connect to the 5G NR RAN 120. For example, as discussed above, the 5G NR RAN 120 may be associated with a particular network carrier where the UE 110 and/or the user thereof has a contract and credential information (e.g., stored on a SIM card). Upon detecting the presence of the 5G NR RAN 120, the UE 110 may transmit the corresponding credential information to associate with the 5G NR RAN 120. More specifically, the UE 110 may associate with a specific cell (e.g., the cell 120A of the 5G NR RAN 120). As mentioned above, the use of the 5G NR RAN 120 is for illustrative purposes and any type of network may be used. For example, the UE 110 may also connect to the LTE-RAN (not pictured) or the legacy RAN (not pictured).

The cell 120A may be equipped with one or more communication interfaces. For example, the cell 120A may be equipped with a communication interface that is configured to communicate with UEs over the unlicensed spectrum. Further, the cell 120A may be configured with various processing components that are configured to perform various operations such as, but not limited to, receiving signals from UEs and other network component, processing received signals and generating signals for transmission. For example, the cell 120A may be equipped with one or more processors. The processors may include one or more baseband processors and/or one or more applications processors. These processors may be configured to execute software and/or firmware. In another example, the cell may be equipped with an integrated circuit with or without firmware. For example, the integrated circuit may include input circuitry to receive signals, processing circuitry to process the signals and other information and output circuitry to output generated signals and information to other components (e.g., a communication interface, a transceiver, etc.). The functionality described herein for the cell 120A may be implemented in any of these or other configurations known in the art for a cell of a network.

In addition to the networks 120 and 122 the network arrangement 100 also includes a cellular core network 130. The cellular core network 130 may be considered to be the interconnected set of components that manages the operation and traffic of the cellular network. The network arrangement 100 also includes the Internet 140, an IP Multimedia Subsystem (IMS) 150, and a network services backbone 160. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
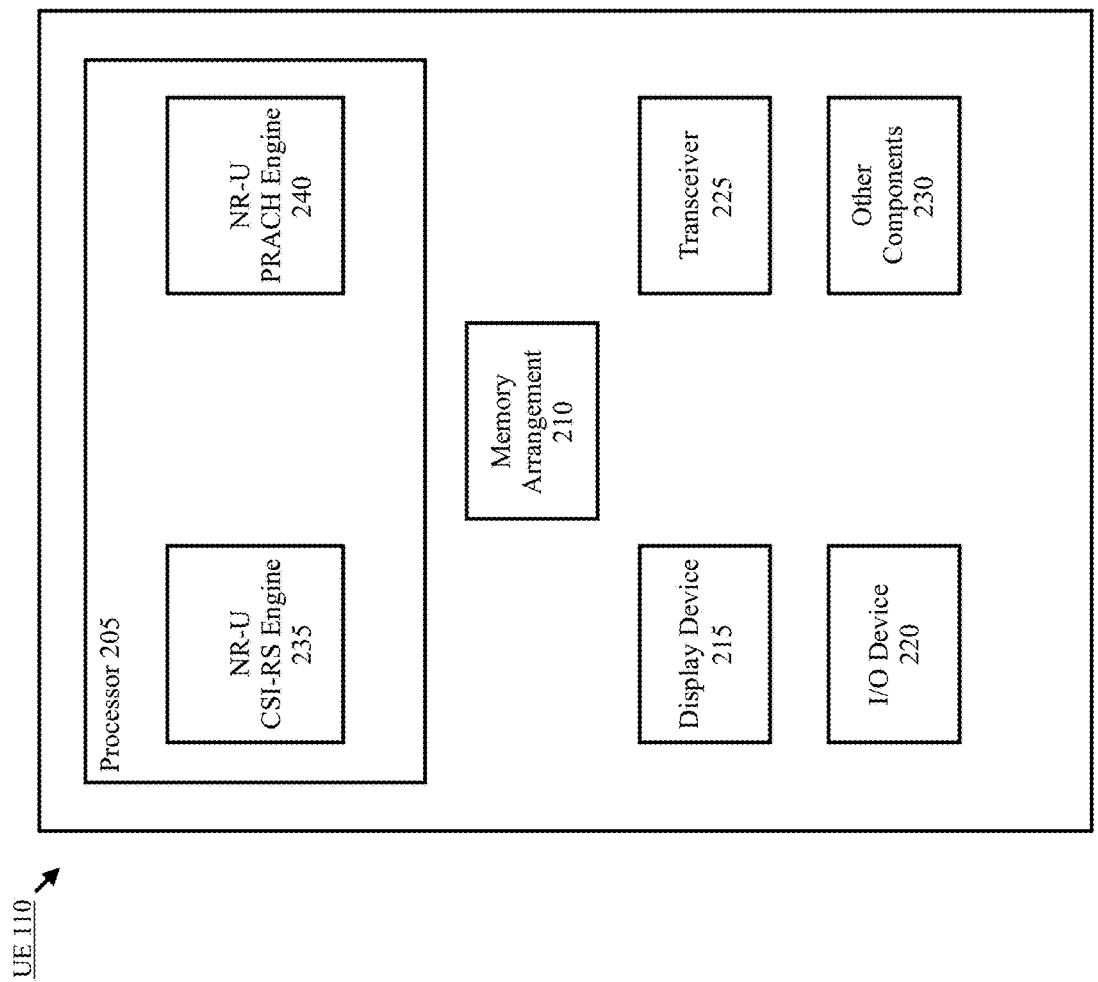
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines for the UE 110. For example, the engines may include an NR-U CSI-RS engine 235. The NR-U CSI-RS engine 235 may perform various operations related to processing and utilizing CSI-RS received over the unlicensed spectrum. For example, the NR-U CSI-RS engine 235 may be configured to determine the time and frequency location of a CSI-RS within a DRS window. The engines may also include an NR-U PRACH engine 240. The NR-U PRACH engine 240 may perform various operations related to a PRACH procedure such as determining when to perform a transmission using a dynamic PRACH resource.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engine may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120 and the WLAN 122. Accordingly, the transceiver 225 may operate on a variety of different frequencies or channels (e.g., set of consecutive frequencies).

Figure 3:
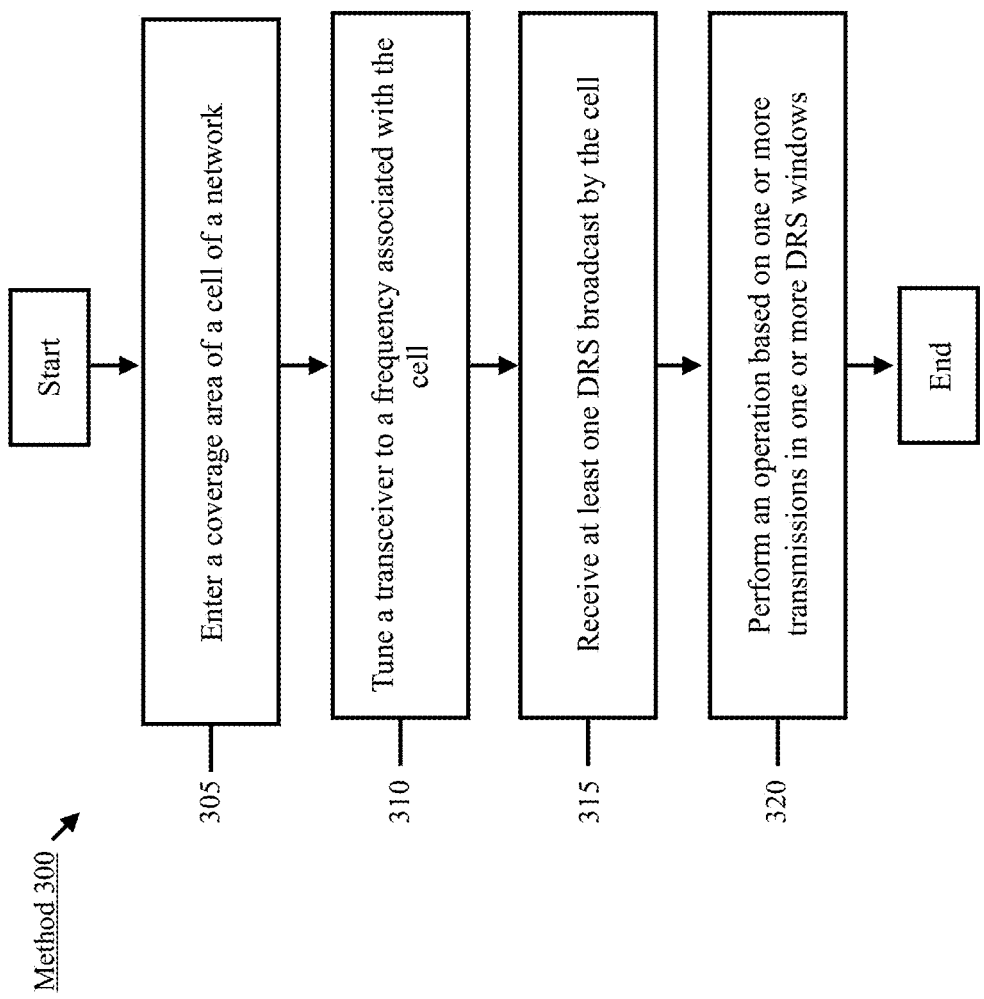
FIG. 3 shows a method for channel state information reference signal (CSI-RS) reception according to various exemplary embodiments.

FIG. 3 shows a method 300 for channel state information reference signal (CSI-RS) reception according to various exemplary embodiments. The method 300 provides a general overview of the context in which CSI-RS may be used by the UE 110. Specific examples of exemplary CSI-RS configuration within a DRS window, CSI-RS detection techniques, CSI-RS transmission and CSI-RS sequence generation will be described in more detail below.

In 305, the UE 110 enters a coverage area of a cell of a network. For example, the cell 120A may be deployed with a coverage area that encompasses a particular geographic location.

In 310, the UE 110 tunes the transceiver 225 to a frequency associated with the cell 120A. For example, in accordance with any of a variety of different procedures, the UE 110 may be configured to search various frequencies for CSI-RS and/or SSBs broadcast by the network. The types of procedures include, but are not limited to, cell search, cell selection, cell reselection, synchronization, RRM, etc.

In 315, the UE 110 receives at least one DRS broadcast by the cell 120A. For example, the cell 120A may be configured to broadcast a DRS during a scheduled DRS window. The UE 110 may receive the DRS while the transceiver 225 of the UE 110 is tuned to the frequency corresponding to the cell 120A. As will be described in more detail below, the DRS window may include multiple NZP-CSI-RS paired with a corresponding SSB. The UE 110 may determine the time and frequency location of an NZP-CSI-RS using any detection technique described below or any appropriate detection technique.

In 320, the UE 110 performs an operation based on one or more transmissions in one or more DRS windows. For example, the UE 110 may collect and/or average measurement data/results by measuring CSI-RS transmissions included in the one or more DRS windows. The measurement data may then trigger the UE 110 to initiate an operation such as cell selection. In another example, the UE 110 may perform an operation related to beam selection and/or beam management. However, the exemplary embodiments are not limited to the UE 110 utilizing the measured results in one or multiple DRS windows for any particular purposes. There are a wide variety of different operations performed by the UE 110 that may be directly or indirectly influenced by the measurement results in one or more DRS windows and the exemplary embodiments may apply to any appropriate operation or procedure. Subsequently, the method 300 ends.

Figure 4:
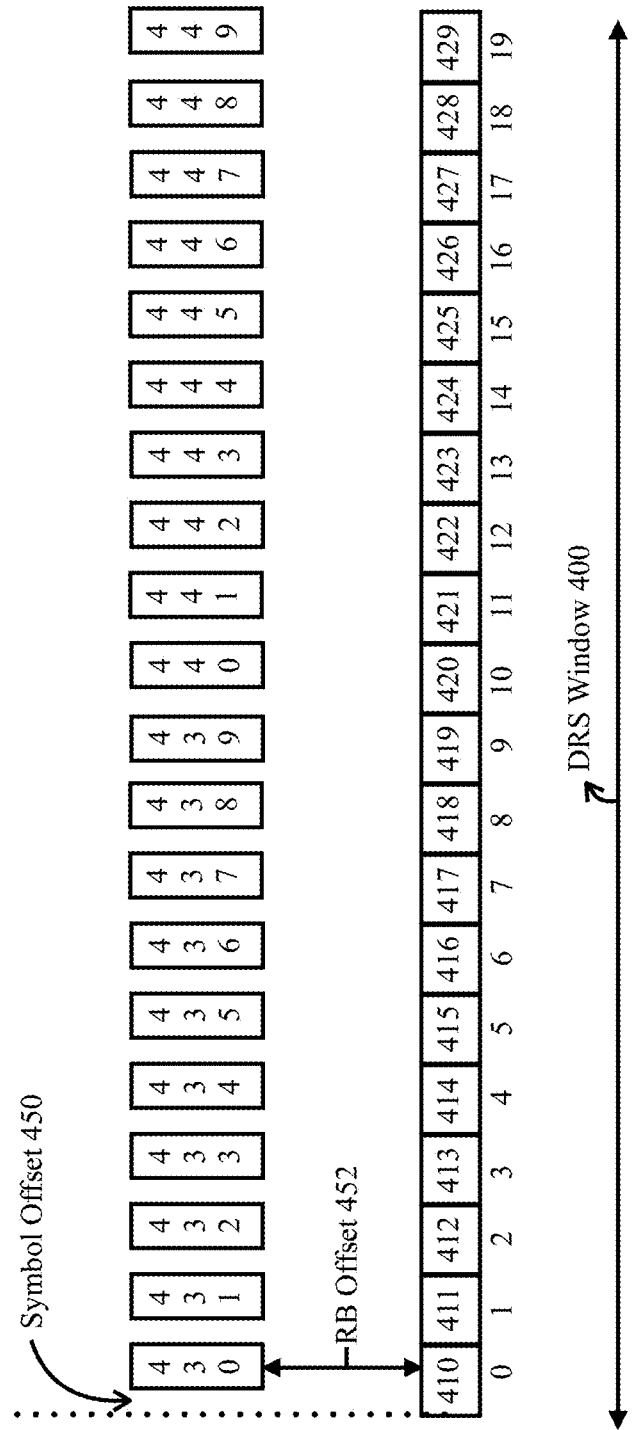
FIG. 4 shows an example of an exemplary channel state information reference signal (CSI-RS) arrangement within a discovery reference signal (DRS) window according to various exemplary embodiments.

FIG. 4 shows an example of an exemplary channel state information reference signal (CSI-RS) arrangement within a discovery reference signal (DRS) window 400 according to various exemplary embodiments. This example will be described with regard to the CSI-RS within the DRS window being NZP-CSI-RS. However, the exemplary embodiments are not limited to NZP-CSI-RS and may apply to any appropriate type of reference signal or zero power (ZP) CSI-RS or CSI interference measurement (CSI-IM).

The DRS window 400 represents a time duration of 5 ms. Within the DRS window 400 there is a 30 kilohertz (kHZ) subcarrier spacing and twenty synchronization signal blocks (SSBs) 410-429 are provided. Those skilled in the art will understand that each SSB may include at least one primary synchronization signal (PSS), at least one secondary synchronization signal (SSS), at least one physical broadcast channel (PBCH) demodulation reference signal (DMRS) and PBCH data. Each SSB 410-429 is paired with a corresponding NZP-CSI-RS, and thus there are twenty NZP-CSI-RS 430-449 included in the DRS window 400. Both the SSBs 410-429 and the NZP-CSI-RS 430-449 are indexed from #0-19 in ascending order. The index # is shown below SSBs 410-429. The above example describes the content of the DRS window 400 using specific values. However, the above example is merely provided for illustrative purposes. For example, the DRS window is not required to be configured for twenty instances of NZP-CSI-RS. The DRS window may be configured for (M) NZP-CSI-RS and indexed from 0 to M−1. Those skilled in the art will understand that the exemplary configuration may be applicable to any appropriate number of NZP-CSI-RS and SSBs.

As indicated above, each NZP-CSI-RS may be paired with an SSB. The network may configure the UE 110 with one NZP-CSI-RS within an orthogonal frequency-division multiplexing (OFDM) symbol of the corresponding SSB. The NZP-CSI-RS may be used by the UE 110 to generate CSI report or RRM measurement data/result. From the perspective of the UE 110, the time and frequency location of an NZP-CSI-RS may be determined using any of a variety of different detection techniques. As will be described in more detail below, one exemplary detection technique may be based on a symbol offset and a resource block (RB) offset between a paired NZP-CSI-RS and SSB. When the UE 110 knows the configured symbol offset and the RB offset, the UE 110 may locate the NSZP-CSI-RS within the DRS window using the offset parameters.

Each of the NZP-CSI-RS 430-449 may be configured with a symbol offset parameter which may be defined relative to the first symbol of its paired SSB 410-429. An example of the symbol offset is shown within the DRS window 400 as symbol offset 450 which is shown as between the SSB 410 and the NZP-CSI-RS 430. While the symbol offset 450 is only depicted for the single pair of NSP-CSI-RS 410 and SSB 430, the symbol offset parameter may be implemented for each pair illustrated within the DRS window 400.

The DRS window 400 may also include a resource block (RB) offset 452. In some embodiments, the RB offset may be defined relative to the lowest RB of the corresponding SSB. In other embodiments, the RB offset may be defined relative to the highest RB of the corresponding SSB. In further embodiments, the starting RB used to define the RB offset may be explicitly configured by a system information block (SIB) such as SIB 1. While the RB offset 452 is only depicted for the single pair of NSP-CSI-RS 430 and SSB 410, the RB offset may be implemented for each pair illustrated within the DRS window 400. Thus, the UE 110 may either be preconfigured with the values of the symbol offset parameter and the RB offset parameter or may receive an indication of these offset parameters from the network. Accordingly, unlike conventional approaches, the UE 110 does not need to blindly search each candidate location because the UE 110 may be able to determine the location of the NZP-CSI-RS using, at least in part, the offset parameters.

In some exemplary embodiments, the UE 110 may be provided with an indication of the frequency domain occupation of the NZP-CSI-RS resources within the DRS window 400. The frequency domain occupation may be provided in units of RBs or any other appropriate unit. Accordingly, unlike conventional approaches, the UE 110 does not need to blindly search each candidate location because the UE 110 may be able to determine the location of the NZP-CSI-RS using, at least in part, the frequency domain occupation information.

Figure 5:
FIG. 5 shows a table that illustrate a non-zero power channel state information reference signal (NZP-CSI-RS) configuration.

FIG. 5 shows a table 500 that illustrates a non-zero power channel state information reference signal (NZP-CSI-RS) configuration. The information illustrated in the table 500 may be used for encoding and/or decoding a DRS window.

The column 502 identifies a row index (0-M) for each NZP-CSI-RS that may be included in a DRS window. For example, the NZP-CSI-RS 430-449 depicted in the DRS window 400 are indexed from 0-19. Thus, within the context of the DRS window 400, M would be 20. The column 504 illustrates the symbol offset to be applied to the NZP-CSI-RS identified by the index value in the corresponding row of the table 500. In this example, the symbol offset is depicted in the table as $\Delta_{offset,tM}$. Similarly, the column 506 illustrates the RB offset to be applied to the NZP-CSI-RS identified by the index value in the same row of the table 500. In this example, the symbol offset is depicted in the table as $\Delta_{offset,fM}$.

While not depicted in the table 500, in some embodiments, an indication of the frequency domain occupation may also be included in this type of table. Alternatively, the frequency domain occupation $B_{CSI-RS}$ may be implicitly determined by $B_{CSI-RS}=B_{LBTsubband}-B_{SSB}$ Here, $B_{LBTsubband}$ represents the bandwidth of listen-before-talk (LBT) operation and $B_{SSB}$ represents the bandwidth of the SSB. For NR-U, the bandwidth of the SSB may be twenty physical resource blocks (PRBs).

In some exemplary embodiments, a bitmap of NZP-CSI-RS configuration may be provided by the network in a SIB. For example, the cell 120A may broadcast information in SIB1 that includes the bitmap of the NZP-CSI-RS configuration in the DRS window. In the SIB1, if the most significant bits (MSB) $k, k \geq 1$ of NZP-CSI-RS in DRS is set to a first value (e.g., 1), the UE 110 may assume that one or more NZP-CSI-RS candidates within the DRS that are paired with their quasi co-located (QCLed) SSBs k-1 may be transmitted. If the MSB k,k≥1 is set to a second value (e.g., 0), the UE 110 may assume that the NZP-CSI-RS that are paired with their QCLed SSBs k-1 are not transmitted.

In accordance with another exemplary detection technique, the UE 110 may assume that the NZP-CSI-RS broadcast by a serving cell (e.g., cell 120A) within a DRS window or across DRS windows are QCLed with respect to average gain, QCL-type A and QCL-type D properties if a value of $N_{CSI-RS}$ mod $N_{CSI-RS}^{QCL}$ is the same among the NZP-CSI-RS candidate. $N_{CSI-RS}$ ($0 \leq_{CSI-RS} \sim M$) represents the NZP-CSI-RS index within the DRS window. Further, $N_{CSI-RS}^{QCL}$ may represent the number of non-QCLed NZP-CSI-RS and may be provided by the network in the SIB1 or PBCH. Alternatively, $N_{CSI-RS}^{QCL}$ may be determined based on the $N_{SSB}^{QCL}$ signaled for SSB transmission. As will be explained below, the NZP-CSI-RS may be configured into sets and a first NZP-CSI-RS included in a first set may be QCLed with another NZP-CSI-RS in each of the other sets. This will be explained in more detail below with regard to FIG. 6.

In some exemplary embodiments, the UE 110 may assume that the NZP-CSI-RS $N_{CSI-RS}^{QCL}$ is not transmitted if the corresponding paired SSB is not detected within the DRS window. In other words, the presence of the SSB serves as an indication of a paired NZP-CSI-RS within a DRS window. Furthermore, the UE 110 may assume that the other QCLed NZP-CSI-RS with index $N_{CSI-RS}^{QCL}$ are not transmitted within a same DRS window and then skip CSI or RRM measurements based on the NZP-CSI-RS occasions if one NZP-CSI-RS with $N_{CSI-RS}^{QCL}$ has been detected in the earlier transmission occasion of the DRS window. This mechanism provides power saving benefits to the UE 110 because the UE 110 is not blindly searching for NAZP-CSI-RS that have not been transmitted.

Figure 6A:
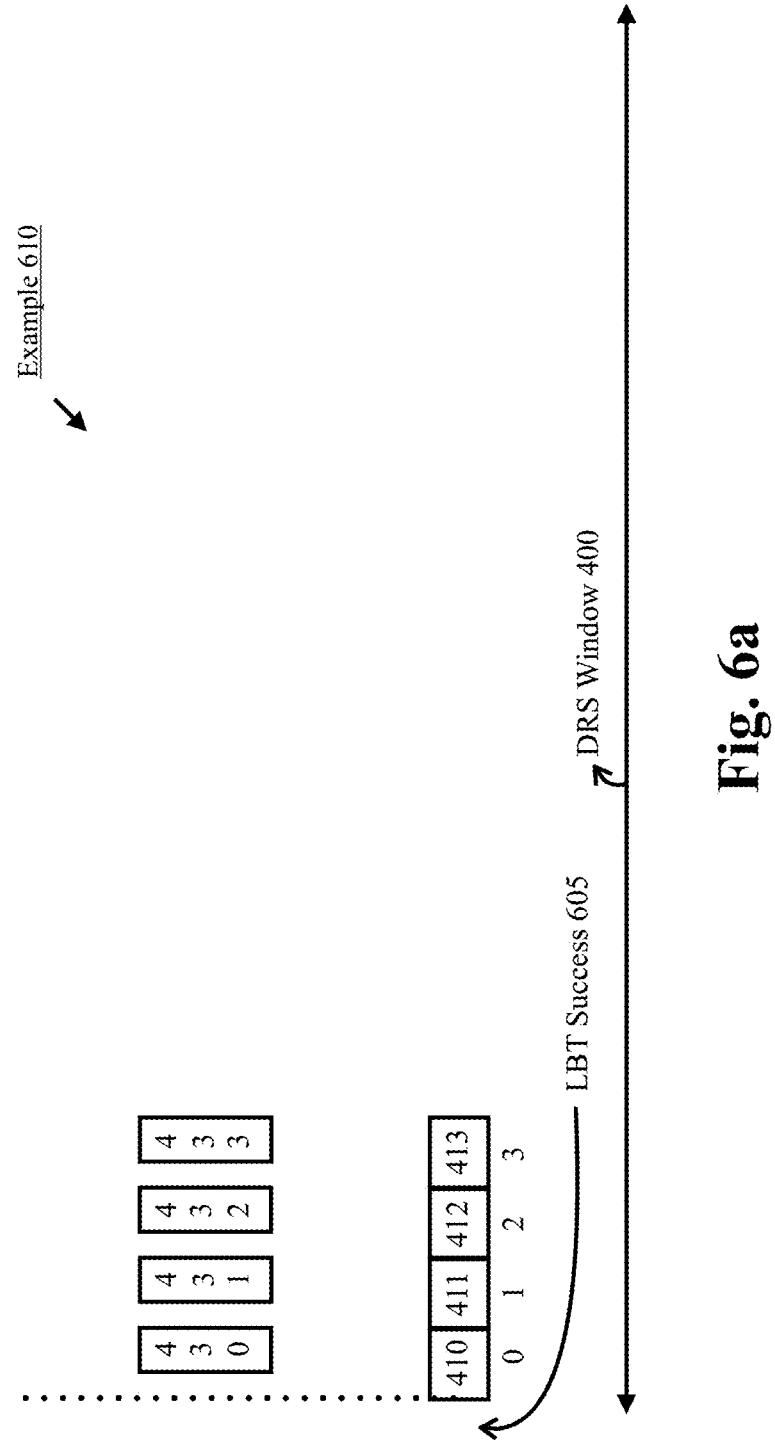
FIG. 6a-b shows examples of NZP-CSI-RS transmission within a DRS window according to various exemplary embodiments.
Figure 6B:
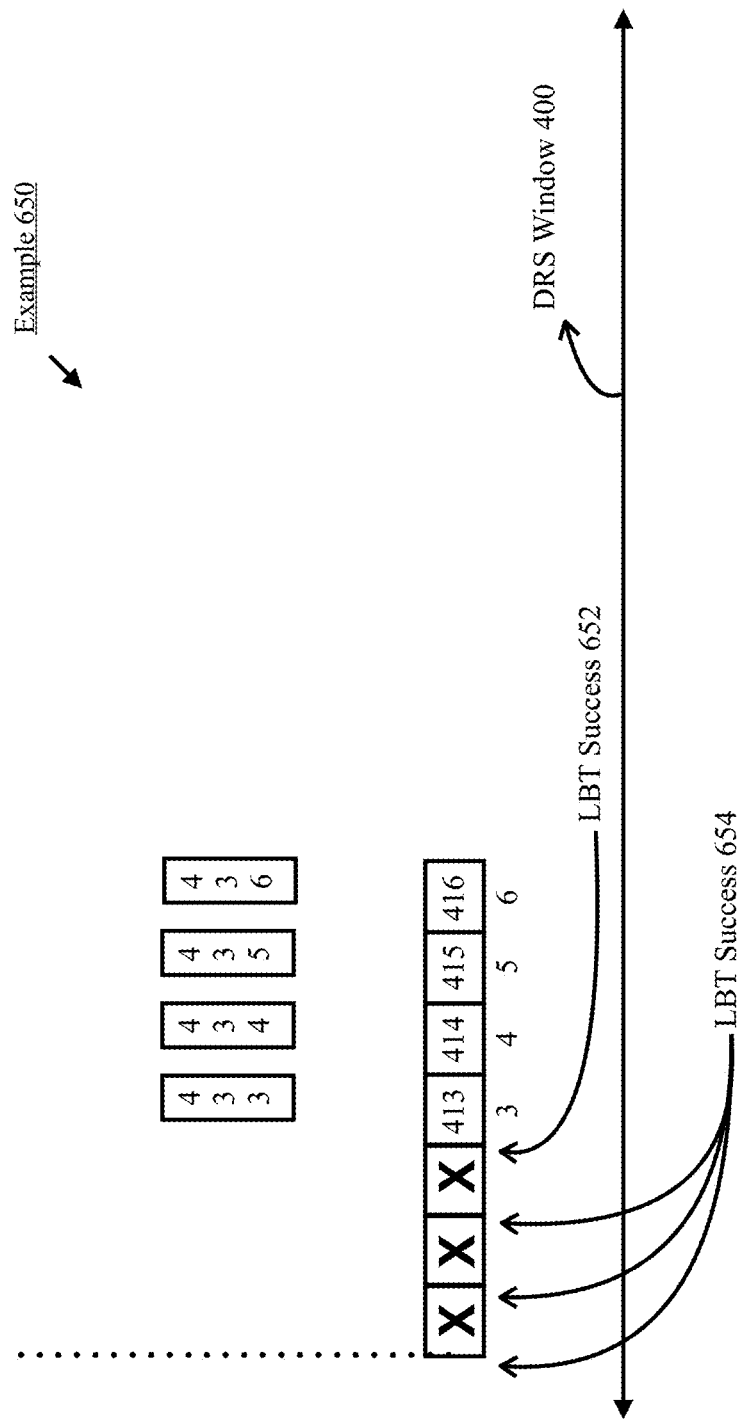

FIGS. 6a-b show examples of NZP-CSI-RS transmission within a DRS window according to various exemplary embodiments. FIGS. 6a-b are described with regard to the exemplary CSI-RS arrangement and DRS window 400 illustrated in FIG. 4. Thus, in these examples, the DRS window 400 may include (M) NZP-CSI-RS, where M=20. FIGS. 6a-b relate to the transmission of the DRS by the cell 120A. While the DRS window 400 may accommodate up to twenty pairs of NZP-CSI-RS and SSBs, less than twenty pairs may actually be transmitted.

In these examples, the candidate NZP-CSI-RS 430-449 may be configured into sets, where each set includes four NZP-CSI-RS. Each NZP-CSI-RS in a set is QCLed with an NZP-CSI-RS in each of the other sets. During operation, the UE 110 may assume that only one of the QCLed NZP-CSI-RS are transmitted within a DRS window. Thus, in this example, $N_{CSI-RS}^{QCL}$=4 and there are four groups of QCLed NZP-CSI-RS. Group 1 includes NZP-CSI-RS with index #: 0, 4, 8, 12, 16. Group 2 includes NZP-CSI-RS with index #: 1, 5, 9, 13, 17. Group 3 includes NZP-CSI-RS with index #: 2, 6, 10, 14, 18. Group 4 includes NZP-CSI-RS with index #: 3, 7, 11, 15, 19.

The cell 120A may perform LBT prior to transmitting the NZP-CSI-RS and SSB pairs. As shown in examples 610 and 650, the cell 120A may be configured to transmit four pairs of NZP-CSI-RS and SSBs after LBT is successful.

The example 610 shows a scenario in which the LBT succeeds before the transmission of the first SSB in the DRS window (e.g., SSB index #0). LBT success is indicated by 612 in FIG. 6a. Thus, the first four pairs of NZP-CSI-RS and SSB are transmitted. The UE 110 may assume that if it receives an NZP-CSI-RS, the other QCLed NZP-CSI-RS in the corresponding group are not transmitted. For instance, within the context of the example 610, NZP-CSI-RS 430-433 with index #0-3 are transmitted. As shown above, NZP-CSI-RS index #0 is included in Group 1. Since NZP-CSI-RS index #0 is transmitted the UE 110 may assume that the other NZP-CSI-RS in Group 1 (e.g., #4, #8, #12, #16) are not transmitted. The UE 110 may make similar assumptions about Groups 2-4. Accordingly, the UE 110 may assume that the remaining NZP-CSI-RS candidates (434-449) are not transmitted. This mechanism provides power saving benefits to the UE 110 because the UE 110 is not blindly searching for NAZP-CSI-RSs that have not been transmitted.

The example 650 shows a scenario in which the LBT succeeds before the transmission of the fourth SSB in the DRS window (e.g., SSB index #3). LBT success is indicated by 652 in FIG. 6b and LBT failure is indicated by 654 in FIG. 6b. Thus, in this example, the first three pairs of NZP-CSI-RS and SSB are not transmitted due to LBT failure. After the LBT success 652, four consecutive NZP-CSI-RS pairs are transmitted. As mentioned above, the UE 110 may assume that if it receives an NZP-CSI-RS, the other QCLed NZP-CSI-RS in the corresponding group are not transmitted. For instance, within the context of the example 650, NZP-CSI-RS 433-436 with index #3-6 are transmitted. As shown above, NZP-CSI-RS index #3 is included in Group 4. Since NZP-CSI-RS index #3 is transmitted the UE 110 may assume that the other NZP-CSI-RS in Group 4 (e.g., #7, #11, #15, #19) are not transmitted. The UE 110 may make similar assumptions about Groups 1-3. Accordingly, the UE 110 may assume that the remaining NZP-CSI-RS candidates (437-449) are not transmitted. This mechanism provides power saving benefits to the UE 110 because the UE 110 is not blindly searching for NAZP-CSI-RSs that have not been transmitted.

In some embodiments, the UE 110 may assume that certain NZP-CSIRS are not transmitted based on downlink control information (DCI). For example, the UE 110 may be configured to monitor DCI format 2_0 which may include channel occupancy time (COT) duration information. If the UE 110 does not detect a DCI format 2_0 indicating the configured NZP-CSI-RS within a COT duration or detects a DCI formant 2_0 indicating any of the corresponding LBT bandwidth is not available for downlink reception, the UE 110 may assume that NZP-CSI-RS are not transmitted by the cell 120A.

Figure 7:
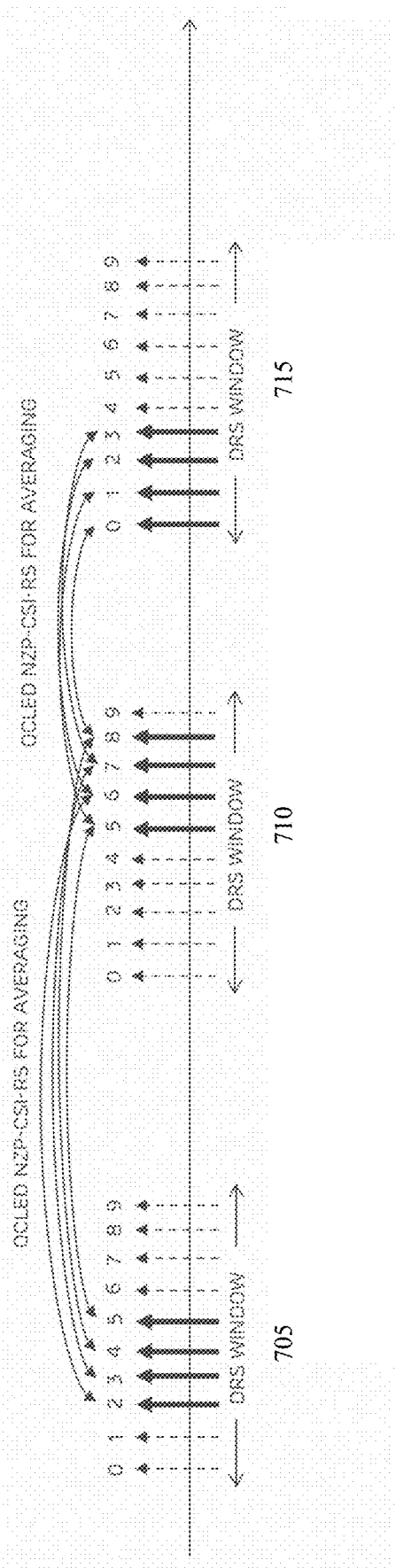
FIG. 7 shows an example of collecting measurement data/results using NZP-CSI-RS from multiple DRS windows according to various exemplary embodiments.

FIG. 7 shows an example of collecting measurement data/results using NZP-CSI-RS from multiple DRS windows according to various exemplary embodiments. FIG. 7 shows three DRS windows 705, 710 and 715. The dotted lines under each index #0-9 represent an instance in which an NZP-CSI-RS is not transmitted, e.g., due to LBT failure at the gNB side. Alternatively, the solid lines under each index #0-9 represent an instance in which an NZP-CSI-RS is transmitted.

The UE 110 may be configured to collect measurement data/results from multiple DRS windows and then average the measurement data/results across QCLed NZP-CSI-RS time instances from the different DRS windows. This technique may improve the accuracy of the CSI measurement data. In this example, RRM measurement data (e.g., layer 1 (L1) received signal strength indicator (RSSI)) is collected from NZP-CSI-RS index #2-5 in DRS window 705, NZP-CSI-RS index #5-8 in DRS window 710 and NZP-CSI-RS index #0-3 in DRS window 715. The arrows above the DRS windows 705-715 in FIG. 7 illustrate which NZP-CSI-RS are QCLed in this example. The measurement data corresponding to a set of QCLed NZP-CSI-RS may then be averaged together.

In some embodiments, the UE 110 may be configured to perform the DRS window averaging demonstrated above with a radio resource control (RRC) message. For example, during RRM measurement configuration, the UE 110 may receive an RRC signal indicating whether the UE 110 is to perform DRS window averaging.

In some embodiments, a threshold may be implemented to ensure that DRS window averaging is not skewed by outliers. For example, if L1 RSSI is not within a predetermined threshold range, the L1 RSSI may be excluded from being considered in the averaging operation. This information may also be excluded from the corresponding L1 measurement repot.

Figure 8:
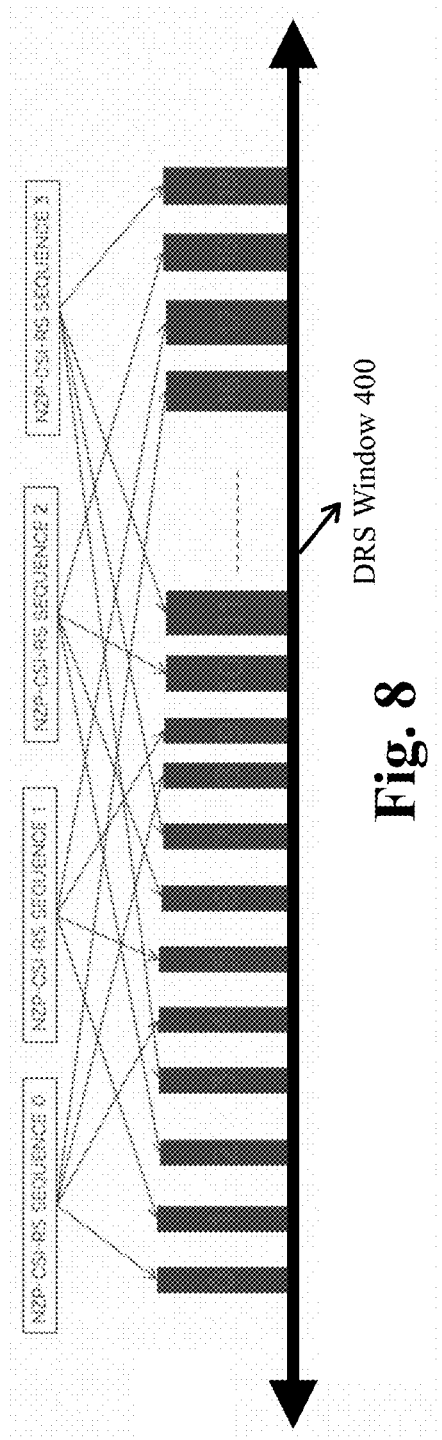
FIG. 8 shows an example of a repeated NZP-CSI-RS sequence within a DRS window according to various exemplary embodiments.

FIG. 8 shows an example of a repeated NZP-CSI-RS sequence within a DRS window according to various exemplary embodiments. Using repeated NZP-CSI-RS sequences may simplify CSI and RRM measurement computation at the UE 110. As shown in FIG. 8 and the equation provided below, each sequence is generated based on one NZP-CSI-RS transmission occasion within the DRS window and then repeated in other transmissions occasions within the same DRS window.

FIG. 8 shows the DRS window 400 and a set of (M) NZP-CSI-RS where M=20. Thus, the NZP-CSI-RS are indexed from #0-19. In this example, four sequences are used. NZP-CSI-RS sequence 0 is generated based on the NZP-CSI-RS transmission occasion identified by index #0 and then repeated for other transmissions occasions within the same DRS window (e.g., index #4, #8, #12 (not shown), #16). Similarly, NZP-CSI-RS sequence 1 is generated based on the NZP-CSI-RS transmission occasion identified by index #1 and also includes index #5, #9, #13 (not shown) and #17. NZP-CSI-RS sequence 2 is generated based on the NZP-CSI-RS transmission occasion identified by index #2 and also includes index #6, #10, #14 (not shown) and #19. NZP-CSI-RS sequence 3 is generated based on the NZP-CSI-RS transmission occasion identified by index #3 and includes index #7, #11, #15 (not shown) and #19.

The UE 110 may assume that the QCLed NZP-CSI-RS sequence r(m) is defined as:

$$r(m) = \frac{1}{\sqrt{2}}(1 - 2*c(2m)) + j\frac{1}{\sqrt{2}}(1 - 2c(2m+1))$$

The pseudo-random sequence is to be initialized with the following equation at the start of each OFDM symbol:

$$c_{init}=(2^{10}(N_{symb}^{slot}(n_{s,f}^{\mu} \bmod N_{CSI-RS}^{QCL}+l+1)(2n_{ID}+1)+I_D)\bmod 2^{31}$$

Here, $n_{s,f}^{\mu}$ is the slot number within a radio frame, l is the OFDM symbol number within a slot for a transmission occasion within the first $N_{CSI-RS}^{QCL}$ transmission occasion and n is configured by higher layers.

As mentioned above, in a second aspect, the exemplary embodiments relate to implementing dynamic PRACH resource allocation. During a PRACH procedure, the UE 110 is configured to send a message (e.g., msg1) to the cell 120A. Those skilled in the art will understand that msg1 relates to the PRACH preamble. Under conventional circumstances, the UE 110 is configured with random access occasions (RO) during which a PRACH transmission may occur. If LBT fails during a first RO, the UE 110 may then attempt the PRACH transmission during the next scheduled RO. However, this causes the PRACH procedure to experience latency. As will be explained in detail below, the exemplary embodiments may include implementing a mapping between an SSB and available RO in a dynamic manner based on COT grabbed by the cell 120A.

Figure 9A:
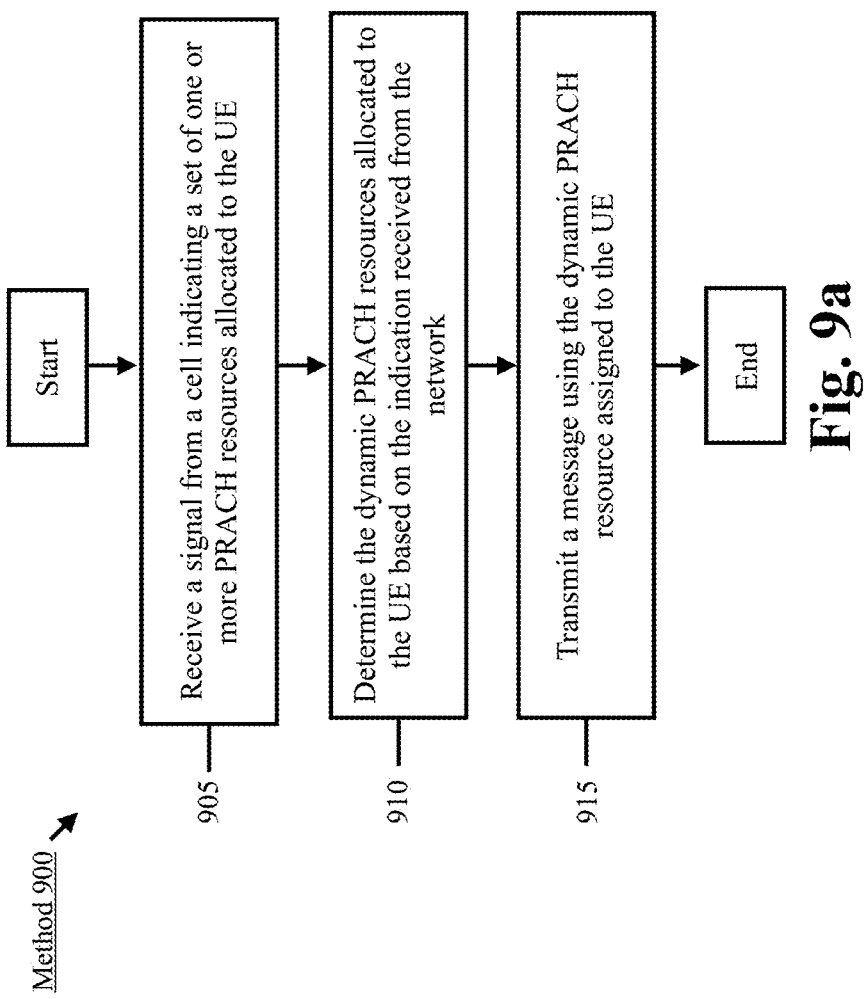
FIG. 9a shows a method for allocating dynamic physical random access channel (PRACH) resources from the perspective of the UE according to various exemplary embodiments.

FIG. 9a show a method 900 for allocating dynamic physical random access channel (PRACH) resources from th perspective of the UE 110 according to various exemplary embodiments.

In 905, the UE 110 receives a signal from the cell 120A indicating a set of one or more PRACH resources allocated to the UE 110. In some embodiments, the signal may be DCI format 2_0 that is used for indicating COT duration and available RB sets. In other embodiments, the signal may be DCI format 1_0 for scheduling SIB1 transmission. For example, either DCI format 2_0, DCI format 1_0 or DCI format 1_1 may be configured to include an information element (IE) that provides the indication of the set of one or more PRACH resources.

In 910, the UE 110 determines the dynamic PRACH resources allocated to the UE 110. For example, the signal received in 905 may indicate a row index in an allocation table. The allocation table may be preconfigured at the UE 110 or may be configured by SIB1. The allocation table will be described in more detail below with regard to FIG. 10.

Figure 10:
FIG. 10 shows an example of an allocation table that may be provided to the UE to determine the dynamic PRACH resources allocated to the UE according to various exemplary embodiments.

FIG. 10 shows an example of an allocation table 1000 that may be provided to the UE 110 to determine the dynamic PRACH resources allocated to the UE 110 according to various exemplary embodiments. The allocation table 1000 includes an index column 1002, a symbol offset (K3) column 1004, a frequency domain column (F) 1006 that indicates the number of PRACH resources in the frequency domain and a time domain (T) column 1008 that indicates the number of PRACH resources in the time domain.

Figure 11:
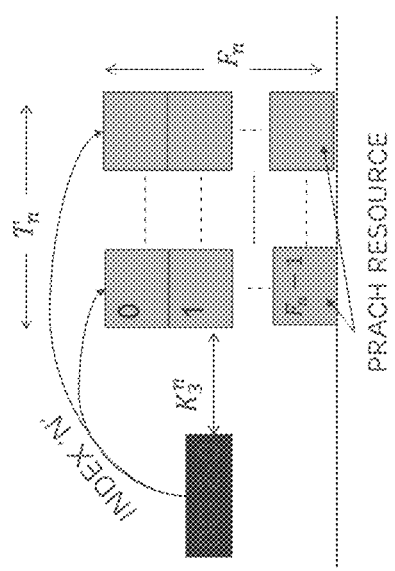
FIG. 11 shows an example of dynamic resource allocation by DCI format 2_0 according to various exemplary embodiments.

FIG. 11 shows an example of dynamic resource allocation by DCI format 2_0 according to various exemplary embodiments. In this example, the symbol offset (K3) and the index are defined relative to the DCI format 2_0. The time domain and the frequency domain are defined relative to the index.

While not pictured in the allocation table 1000, in some embodiments, LBT parameters may also be configured to each row of the allocation table. For example, to facilitate LBT operation, a gap (e.g., a number of symbols) may be reserved between each RO. The duration of the gap may be included in the allocation table 1000 or may be preconfigured in any other appropriate manner. Alternatively, part of the PRACH samples may be adjusted to create the gap between consecutive RO. For example, the last samples of an earlier RO or the first samples of a subsequent PRACH format may be punctured.

Returning to the method 900, in 915, the UE 110 transmits a message to the cell 120A using the dynamic PRACH resources allocated to the UE 110. For example, the UE 110 may transmit msg1 to the cell 120A on the dynamic PRACH resource allocated to the UE 110. Subsequently, the remaining portion of the PRACH procedure may be performed.

In some embodiments, PRACH resources may be allocated based on, at least in part, the RRC state of the UE 110. Thus, a UE 110 in an RRC connected state may be allocated different PRACH resources than the UE 110 in the RRC idle state. For example, the UE 110 in RRC idle state may be signaled in SIB1 whether enhanced long sequence PRACH format are to be used for channel access. The UE 110 in RRC connected state may be configured with a separate PRACH resource with the same or different formats to that configured for initial access, e.g., for contention free random access (CFRA) or handover between different component carriers (CCs) on the unlicensed band.

In some embodiments, a long sequence may be configured by the cell 120A for initial access and a short sequence may be conditionally and dynamically transmitted within a cell 120A initiated COT. The sequence length (e.g. long or short) may be configured as part of the allocation table by higher layers, e.g., RRC signaling then dynamically signaled by DCI format 2_0 on a per COT basis after grabbing the COT by the cell 120A.

Figure 9B:
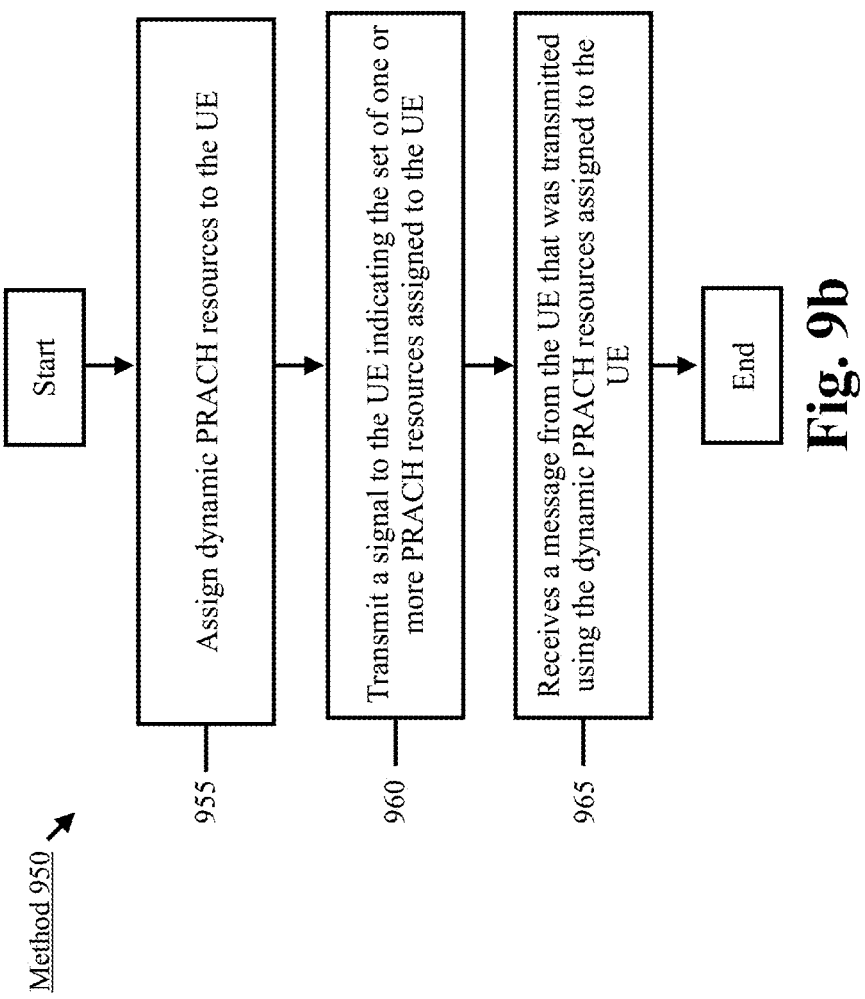
FIG. 9b shows a method for allocating dynamic physical random access channel (PRACH) resources from the perspective of the cell according to various exemplary embodiments.

FIG. 9b shows a method 950 for allocating dynamic physical random access channel (PRACH) resources from the perspective of the cell 120A according to various exemplary embodiments.

In 955, the network assigns dynamic PRACH resources to the UE 110. In some embodiments, the dynamic PRACH resources may be assigned based, at least in part, on the RRC state of the UE 110. For example, as indicated above, if UE 110 is in RRC idle state, the network may configure a long sequence PRACH format to be used by the UE 110 for channel access. If the UE 110 is in RRC connected state, the network may configure the UE 110 with a separate PRACH resource with the same or different formats to that configured for initial access, e.g., for contention free random access (CFRA) or handover between different component carriers (CCs) on the unlicensed band.

In some embodiments, a long sequence may be configured by the cell 120A for UE 110 initial access and a short sequence may be conditionally and dynamically transmitted within a cell 120A initiated COT. The sequence length (e.g. long or short) may be included as part of the allocation table by higher layers, e.g., RRC signaling then dynamically signaled by DCI format 2_0 on a per COT basis after the cell 120A grabs the corresponding COT. However, the exemplary embodiments are not limited to assigning resources to the UE 110 on any particular basis. The exemplary embodiments may apply to the network assigning the PRACH resources based on any appropriate basis (e.g., RRC state of the UE 110, network load, congestion, measurement data, etc.).

In 960, the Cell 120A transmits a signal to the UE 110 indicating the set of one or more PRACH resources assigned to the UE 110. In some embodiments, the signal may be DCI format 2_0 that is used for indicating COT duration and available RB sets. In other embodiments, the signal may be DCI format 1_0 for scheduling SIB1 transmission. For example, either DCI format 2_0, DCI format 1_0 or DCI format 1_1 may be configured to include an information element (IE) that provides the indication of the set of one or more PRACH resources. The signal transmitted in 960 may indicate a row index in an allocation table. The allocation table may be preconfigured at the UE 110 or may be configured by a previously transmitted SIB1. The allocation table was described above with regard to FIG. 10.

In 965, the cell 120A receives a message from the UE 110 that was transmitted using the dynamic PRACH resources assigned to the UE 110. For example, as indicated above, the UE 110 may transmit msg1 to the cell 120A on the dynamic PRACH resource allocated to the UE 110. Subsequently, the remaining portion of the PRACH procedure may be performed.

The following provides some examples of the second aspect of the exemplary embodiments.

A first example is related to a method performed by a user equipment (UE). The method includes receiving a signal broadcast by a cell of a network over a channel in the unlicensed spectrum, wherein the signal includes an indication that one or more physical random access channel (PRACH) resources have been assigned to the UE, determining a time and frequency location of the one or more PRACH resources based on the indication and a set of allocation information and transmitting an uplink signal to the cell using the one or more PRACH resources.

The method as described above, wherein the signal is one of downlink control information (DCI) format 1_0 or DCI format 2_0. The method as described above, wherein the uplink signal is a message 1 (msg1).

The method as described above, wherein the UE is preconfigured with the allocation information or receives the allocation information in a system information block (SIB).

The method as described above, wherein the indication includes an index and the allocation information includes i) a symbol offset, ii) time domain information, iii) frequency domain information, and wherein the symbol offset is defined relative to the location of the signal broadcast by the cell, the time domain information is defined relative to the index and the frequency domain information is defined relative to the index.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A computer readable storage medium comprising a set of instructions, wherein the set of instructions when executed by a processor of a user equipment (UE) causes the processor to perform operations, comprising:

receiving a signal broadcast by a cell of a network over a channel in the unlicensed spectrum, wherein the signal includes a set of channel state information reference signals (CSI-RS) each corresponding to a set of synchronization signal blocks (SSB) and is transmitted during a discovery reference signal (DRS) window;
determining a location of the set of CSI-RS within the DRS window;
performing an operation based on the set of CSI-RS;
determining that a first CSI-RS is quasi co-located (QCLed) with one or more further CSI-RS; and
determining that the one or more CSI-RS are not transmitted by the cell based on determining that the presence of the first CSI-RS that is QCLed with the one or more further CSI-RS in the DRS window, wherein the first CSI-RS transmissions is assumed to be QCLed based on $N_{CSI-RS}$ mod $N_{CSI-RS}^{QCL}$, wherein $N_{CSI-RS}$ ($0 \leq N_{CSI-RS} < M$) represents a CSI-RS index within the DRS window and $N_{CSI-RS}^{QCL}$ represents a number of non-QCLed $N_{CSI-RS}$ and is provided by the network in a system information block 1 (SIB1) or a physical broadcast channel (PBCH), wherein M represents a predetermined number of CSI-RS.

2. The computer readable storage medium of claim 1, wherein determining the location of the set of CSI-RS is based on a first offset parameter and a second offset parameter.

3. The computer readable storage medium of claim 2, wherein the first offset parameter is a symbol offset associated with a first CSI-RS and a first SSB located within the same orthogonal frequency-division multiplying (OFDM) symbol.

4. The computer readable storage medium of claim 2, wherein the second offset parameter is a resource block (RB) offset associated with a first CSI-RS and a first SSB.

5. The computer readable storage medium of claim 4, wherein the (RB) offset is defined relative to the lowest RB of the first SSB or the highest RB of the first SSB.

6. The computer readable storage medium of claim 1, wherein determining the location of the set of CSI-RS is based on determining a frequency domain occupation of the CSI-RS resources within the DRS window.

7. The computer readable storage medium of claim 6, wherein the frequency domain occupation of the CSI-RS resources within the DRS window is determine based on a bandwidth associated with a listen-before-talk (LBT) operation and a bandwidth associated with the set of SSB.

8. The computer readable storage medium of claim 1, wherein determining the location of the set of CSI-RS is based on a bitmap included in a system information block (SIB).

9. The computer readable storage medium of claim 1, the operations further comprising:
initializing a pseudo-random sequence of QCLed CSI-RS (r(m)) at a start of each OFDM symbol and apply it to all QCLed SI-RS within the DRS window, wherein initializing is based $$r(m) = \frac{1}{\sqrt{2}}(1 - 2*c(2m)) + j\frac{1}{\sqrt{2}}(1 - 2c(2m+1))$$

$$c_{init} = \left(2^{10}\left(N_{symb}^{slot}\left(n_{s,f}^{\mu} \mod N_{CSI-RS}^{QCL} + l + 1\right)(2n_{ID} + 1) + n_{ID}\right)\right) \mod 2^{31},$$

wherein $N_{symb}^{slot}$ represents a number of a slot and a symbol within the slot of a radio frame, $n_{s,f}^{\mu}$ is a slot number within the radio frame, l is a OFDM symbol number within a slot for a transmission occasion within a first $N_{CSI-RS}^{QCL}$ transmission occasion and $n_{ID}$ is configured by higher layers.

10. The computer readable storage medium of claim 1, the operations further comprising:
receiving a first Downlink Control Information (DCI) format to determine physical random access channel (PRACH) resource allocation within a channel occupation time (COT) indicated by a second DCI format.

11. The computer readable storage medium of claim 10, wherein the first DCI and the second DCI are DCI format 2_0.

12. The computer readable storage medium of claim 10, wherein the first DCI is DCI format 1_1 and the second DCI is DCI format 2_0.

13. The computer readable storage medium of claim 10, wherein physical random access channel (PRACH) resources are allocated based on a row index of an allocation Table that is configured by SIB1 or preconfigured.

14. A user equipment (UE), comprising:
a transceiver configured to communicate with a network; and
a processor configured to perform operations, the operations comprising:
receiving a signal broadcast by a cell of the network over a channel in the unlicensed spectrum, wherein the signal includes a set of channel state information reference signals (CSI-RS) each corresponding to a set of synchronization signal blocks (SSB) and is transmitted during a discovery reference signal (DRS) window;
determining a location of the set of CSI-RS within the DRS window;
performing an operation based on the set of CSI-RS,
determining that a first CSI-RS is quasi co-located (QCLed) with one or more further CSI-RS; and
determining that the one or more CSI-RS are not transmitted by the cell based on determining that the presence of the first CSI-RS that is QCLed with the one or more further CSI-RS in the DRS window, wherein the first CSI-RS transmissions is assumed to be QCLed based on $N_{CSI-RS}$ mod $N_{CSI-RS}^{QCL}$, wherein $N_{CSI-RS}$($0 \leq N_{CSI-RS} < M$) represents a CSI-RS index within the DRS window and $N_{CSI-RS}^{QCL}$ represents a number of non-QCLed $N_{CSI-RS}$ and is provided by the network in a system information block 1 (SIB1) or a physical broadcast channel (PBCH), wherein M represents a predetermined number of CSI-RS.

15. The UE of claim 14, wherein determining the location of the set of CSI-RS is based on a first offset parameter and a second offset parameter.

16. The UE of claim 15, wherein the first offset parameter is a symbol offset associated with a first CSI-RS and a first SSB located within the same orthogonal frequency-division multiplying (OFDM) symbol.

17. The UE of claim 15, wherein the second offset parameter is a resource block (RB) offset associated with a first CSI-RS and a first SSB and wherein the (RB) offset is defined relative to the lowest RB of the first SSB or the highest RB of the first SSB.

18. The UE of claim 14, the operations further comprising:
receiving a first Downlink Control Information (DCI) format to determine physical random access channel (PRACH) resource allocation within a channel occupation time (COT) indicated by a second DCI format.

19. The UE of claim 18, wherein (i) the first DCI and the second DCI are DCI format 2_0 or (ii) the first DCI is DCI format 1_1 and the second DCI is DCI format 2_0.

20. The UE of claim 18, wherein physical random access channel (PRACH) resources are allocated based on a row index of an allocation Table that is configured by SIB1 or preconfigured.

\* \* \* \* \*